United States Patent [19]

Helble et al.

[11] Patent Number: 5,358,695
[45] Date of Patent: Oct. 25, 1994

[54] PROCESS FOR PRODUCING NANOSCALE CERAMIC POWDERS

[75] Inventors: Joseph J. Helble, Andover, Mass.; Gary A. Moniz, Windham, N.H.; Joseph R. Morency, Salem, Mass.

[73] Assignee: Physical Sciences, Inc., Andover, Mass.

[21] Appl. No.: 7,149

[22] Filed: Jan. 21, 1993

[51] Int. Cl.$^5$ .............................................. C01B 13/34
[52] U.S. Cl. .................................. 423/592; 423/593; 423/594; 423/598; 423/600; 423/608; 423/618; 423/624; 423/625; 423/635; 423/263; 501/1; 501/94
[58] Field of Search ...................... 501/1, 94; 423/593, 423/594, 598, 600, 608, 618, 624, 632, 635, 592, 599, 610, 619, 625, 263

[56] References Cited

U.S. PATENT DOCUMENTS

| | | | |
|---|---|---|---|
| 3,450,503 | 6/1969 | Knorr | 23/277 |
| 3,510,291 | 5/1970 | Brush | 75/5 |
| 3,993,578 | 11/1976 | Gerontopoulos et al. | 252/301.1 R |
| 4,042,374 | 8/1977 | Rasmussen et al. | 75/5 |
| 4,065,544 | 12/1977 | Hamling et al. | 423/263 |
| 4,783,214 | 11/1988 | Kemp, Jr. et al. | 75/5 |
| 4,801,411 | 1/1989 | Wellinghoff et al. | 264/7 |
| 4,812,166 | 3/1989 | Saiki et al. | 75/5 |
| 4,849,140 | 7/1989 | Wellinghoff et al. | 264/9 |
| 5,061,682 | 10/1991 | Aksay et al. | 423/592 |
| 5,124,091 | 6/1992 | Paliwal et al. | 264/15 |

OTHER PUBLICATIONS

Andres, R. P., et al., "Clusters and Cluster-Assembled Materials", *Materials Research*, 4:704–736 (1989) no month.

Bowen, H. Kent, "Basic Research Needs on High Temperature Ceramics for Energy Applications", *Materials Science and Engineering*, 44:1–56 (1980) no month.

Dagani, Ron, "Nanostructured Materials Promise To Advance Range of Technologies", *Science/Technology*, Nov. 23, 1992.

Helble, Joseph J., "Nanometer Oxide Ceramic Particles With Controlled Agglomeration", *Materials & Processing Report*, 5:3–4 (1991) no month.

Helble, Joseph J. et al., "Factors Determining the Primary Particle Size of Flame-Generated Inorganic Aerosols", *J. of Colloid and Interface Science*, 128:348–362 (1989) no month.

Kodas, T. T. et al., "Aerosol Flow Reactor Production of Fine $Y_1Ba_2Cu_3O_7$ Powder: Fabrication of Superconducting Ceramics", *Applied Physics Letters*, 52:1622–1624 (1988) no month.

Matijevic, Egon, "Production of Monodispersed Colloidal Particles", *Annual Review of Materials Science*, 15:483–516 (1985) no month.

Okuyama, Kikuo et al., "Production of Ultrafine Metal Oxide Aerosol Particles by Thermanl Decomposition of Metal Alkoxide Vapors", *AIChE J.*, 32:2010–2019 (1986) no month.

Okuyama, Kikuo, et al., "Experimental Control of Ultrafine $TiO_2$ Particle Generation From Thermal Decomposition of Titanium Tetraisopropoxide Vapor", *Chemical Engineering Science*, 44:1369–1375 (1989) no month.

Ono, Tomoshige, et al., "Ultrafine $BaPb_{1-x}Bi_xO_3$ Powders Prepared by the Spray-ICP Technique", *Plasma Chemistry and Plasma Processing*, 7:201–209 (1987) no month.

(List continued on next page.)

Primary Examiner—Karl Group
Assistant Examiner—C. M. Bonner
Attorney, Agent, or Firm—Testa, Hurwitz & Thibeault

[57] ABSTRACT

Submicron sized ceramic particles are produced by combining a ceramic precursor with an organic or carbonaceous carrier material, and exposing droplets of the mixture to a temperature sufficient to cause combustion of the organic material and subsequent vaporization and nucleation, or diffusion and oxidation, of the ceramic precursor to form pure, crystalline, uniform nanophase ceramic particles.

12 Claims, 7 Drawing Sheets

OTHER PUBLICATIONS

Rice, Gary W., "Laser Synthesis of Si/C/N Powders from 1,1,1,3,3,-Hexamethyldisilazane", *J. of the American Ceramic Society*, 69:C183–C185 (1986) no month.

Siegel, R. W., et al., "Synthesis, Characterization and Properties of Nanophase $TiO_2$", *J. Mater. Res.*, 3:1368–1372 (1988) no month.

Ulrich, Gail D. et al., "Aggregation and Growth of Submicron Oxide Particles in Flames", *J. of Colloid and Interface Science*, 7:257–265 (1982) no month.

Wakai, Fumihiro, "Effects of Solute Ion and Grain Size on Superplasticity of $ZRO_2$ Polycrystals", *J. of Materials Science*, 26:241–247 (1991) no month.

Zachariah, M. R. et al., "Experimental and Numerical Studies on Refactory Particle Formation in Flames", *High Temperature Science*, 28:113–125 (1988–1989) no month.

Zhang, Shi–Chang et al., "Synthesis of Solid, Spherical Zirconia Particles by Spray Pyrolysis", *J. of the American Ceramic Society*, 73:61–67 (1990) no month.

PROCESS FOR PRODUCING NANOSCALE CERAMIC POWDERS

GOVERNMENT INTEREST

The work described herein was funded in part by a grant from the National Science Foundation. The government has certain right in this invention.

BACKGROUND OF THE INVENTION

High-performance ceramic materials are essential for many engineering applications. Ultrafine ceramic powders are needed to provide ceramic structures having the integrity, strength, and uniformity necessary to meet high performance requirements. To obtain many of the desirable properties associated with advanced ceramics, e.g., toughness, high ductility, low sintering temperature and/or superplasticity, ceramic powders having nanometer scale crystalline grain structure, uniformity of crystalline phase, limited degree of particle aggregation, chemical purity, and narrow particle and grain size distributions are essential. Bowen, (1980) *Mater. Sci. Eng.*, 44:1; Andres et al, (1989) *J. Mater. Res.*, 4(3):704; Wakai and Nagano, (1991) *J. Mater. Sci.*, 26(1):241. Large scale exploration of the properties of these materials has been limited, however, by a lack of large quantities of inexpensive nanophase powder having the desired properties.

To address this need, researchers have been exploring many methods of nanophase powder production. For example, spray drying or spray pyrolysis has been used to produce unagglomerated crystalline powders. In this process, precursor salts are dissolved in water which is sprayed into a high temperature environment. Ceramic particles form as a result of nucleation in the liquid phase, driven by evaporation of water. Although chemical purity is high, processing rates are limited by the need to maintain very low concentrations of precursor solute in the droplets to prevent formation of undesirable fragments and cenospheres. Kodas et al., (1988) *Appl. Phys. Lett.*, 52:1622; Zhang et al., (1990) *J. Am. Ceram. Soc.*, 73(1):61. Industrial flame processes such as $SiCl_4$ oxidation are inherently high rate, but are best suited to single component systems such as $TiO_2$ or $SiO_2$, and may produce large sintered agglomerated powders due to the extended residence time at high temperature. Ulrich and Riehl, (1982) *J. Colloid Inter. Sci.*, 87:257. Plasma and laser processes offer improved control over the system chemistry, but particles produced by these processes exhibit extensive agglomeration. Rice, (1986) *J. Am. Ceram Soc.*, 69:C-185; Ono et al., (1987) *Plasma Chem. Plasma Proc.*, 7:207. Sol-gel processes also offer precise control over powder chemistry, but produce agglomerated powders which shrink extensively during the lengthy, energy-intensive, high temperature calcining step which follows. Condensation and oxidation of a metal deposited on a cold finger in a vacuum ("gas condensation method") has been used to generate high purity titania. Siegel et. al., (1988) *J. Mater. Res.*, 3:1367. However, this batch process is inherently low rate.

While the processes described above meet some of the criteria for optimum production of nanophase powders, none combine the high temperatures required for crystallinity with the short processing times required for minimal agglomeration.

SUMMARY OF THE INVENTION

The invention relates to a process for controlled vapor phase nucleation of submicron-sized ceramic oxide particles. The process comprises forming an intimate mixture of an organic or carbonaceous carrier material and ceramic precursor and exposing the mixture to a temperature sufficient to cause the carrier material to oxidize and the ceramic precursor to form ultrafine, nanometer-sized ceramic particles. In this method, the heat resulting from the exothermic oxidation (i.e., combustion) of the carrier material causes the ceramic precursor to either vaporize and nucleate or diffuse away from the burning carrier thereby forming ceramic particles. The resulting particles are highly pure, crystalline and have a narrow particle size distribution. The particles are exposed to the heat of combustion for a very short time, e.g., a few milliseconds, thus, agglomeration is minimized.

The first step of the process comprises combining a ceramic precursor material with organic or carbonaceous carriers. This step may be carried out in a number of ways, using any combustible organic or carbonaceous material as the carrier and any metallic material which can form a ceramic under combustion conditions as the precursor. This step can be carried out, for example, by combining a ceramic precursor, such as a metal salt, with a liquid organic matrix, such as a polymer or polymerizable monomer, and solidifying the matrix to form solid organic particles, or solid organic material which can be ground into particles, which contain the inorganic precursor. Alternatively, the ceramic precursor material can be colloidally dispersed in a solution of an organic carrier. In another embodiment, a solution of ceramic precursor material can be combined with a solid carrier, such as porous carbon, to form a slurry. The liquid then is evaporated, and the precursor becomes adsorbed on the pore wall surfaces of the carbon particles. In another embodiment, a ceramic precursor is dissolved in a solution of an organic material, such as a sugar, and the resulting solution is sprayed, dried and ultimately combusted to form a powder. As demonstrated by these examples, any method can be used to form an intimate mixture of the combustible carrier and the ceramic precursor, as long as the mixture can be formed into discrete droplets or particles for the second, combustion step.

The second step of the present process involves exposing discrete droplets or particles of the carrier/precursor to a temperature sufficient to ignite the carrier material and cause combustion thereof. The carrier/precursor droplets or particles preferably are atomized or fed into the high temperature reactor as an aerosol or fine spray. Combustion of the carrier portion of the particles creates myriad localized temperature gradients, and causes the ceramic precursor portion to either vaporize, diffuse away from the burning carrier and nucleate; or to diffuse away by convective flow from the combusting carrier into the relatively cooler surrounding gas, forming the ceramic particles. For this step, a temperature of at least 1000K and an atmosphere containing at least 20% (by volume) oxygen is preferred. The resulting particles can be collected and used in the desired application.

Ceramic particles which are less than 100 nm in diameter can be produced by the present process. The particles produced are uniform in size, pure, highly crystalline, and non-agglomerated. Ceramic particles produced according to the invention also sinter at lower temperatures than do conventional ceramic powders. The process can be used to produce large quantities of high-quality nanoscale ceramic particles for a variety of engineering applications.

BRIEF DESCRIPTION OF THE DRAWINGS

The foregoing summary of the invention, and the various features thereof, as well as the invention itself may be more fully understood from the following detailed description when read together with the accompanying drawings.

DETAILED DESCRIPTION

Figure 1:
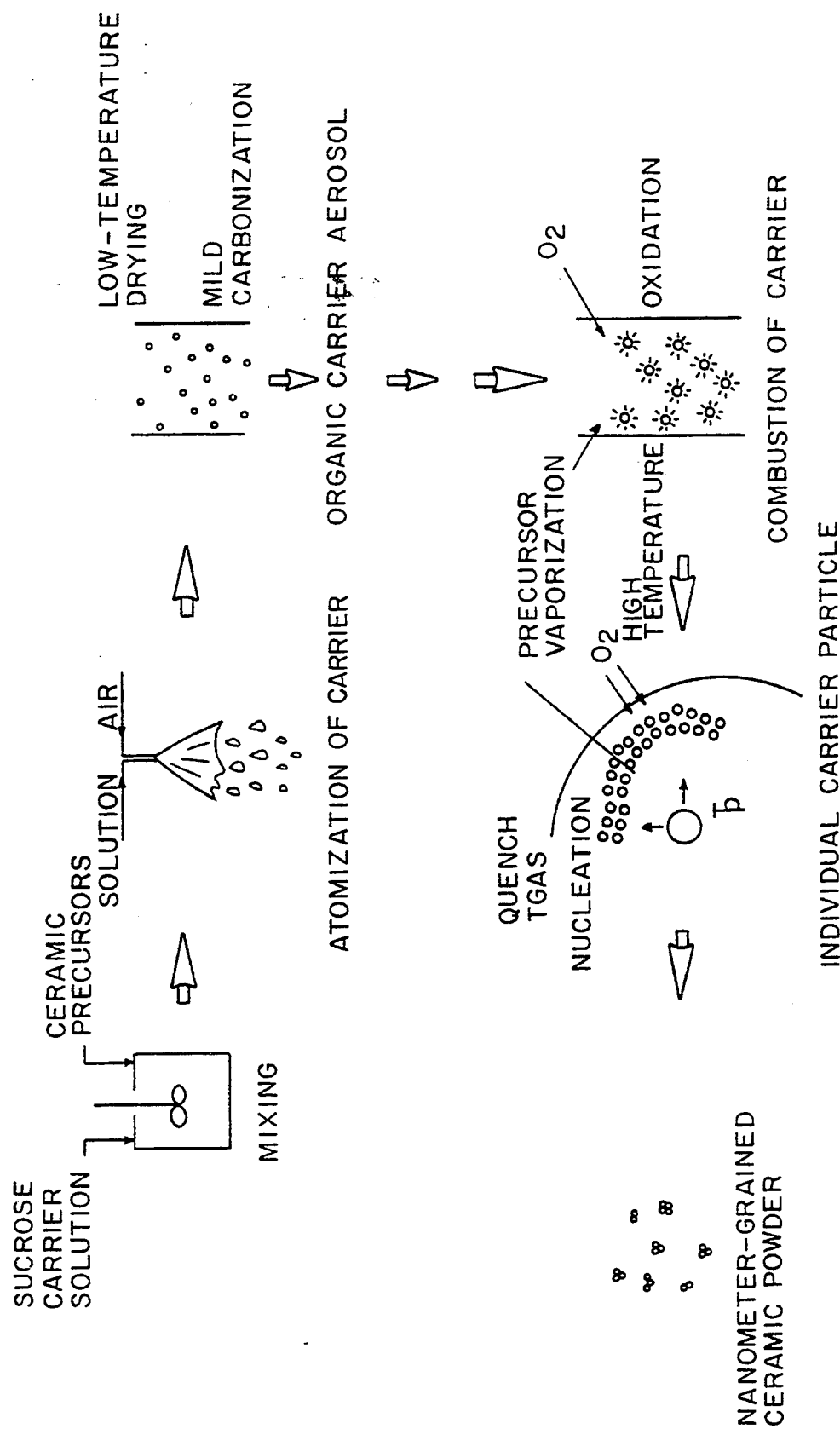
FIG. 1 is a schematic illustration of one embodiment of the present process.

The development of advanced ceramic components requires large quantities of ceramic powders having nanometer scale grain structure and narrow grain size distribution. The grains or particles which comprise these powders must be chemically pure, crystalline, and narrowly agglomerated. The present high temperature, short residence time aerosol process produces nanometer scale ceramic oxide powders having all of these characteristics. The process can be scaled up to produce the powders on an industrial scale.

To produce non-agglomerated crystalline ceramic oxide particles in the range of 10 to 100 nm, processing preferably is carried out at high temperatures and for short periods of time, e.g., millisecond timescales. Processing for longer periods of time may lead to grain growth and particle agglomeration, while processing at lower temperatures may produce amorphous material requiring further heat treatment. The present process utilizes the high temperature exothermic oxidation (i.e., combustion) of an organic or carbonaceous carrier to generate steep localized temperature gradients. The organic or carbonaceous carrier burns completely away, and pure ceramic particles are formed. Growth of the ceramic particles can be precisely controlled by this method.

The steps in the present process are generally as follows: an organic or carbonaceous carrier material is combined with a ceramic precursor to form an intimate mixture in which the ceramic precursor is closely associated with the carrier. This mixture is atomized and exposed as an aerosol or fine spray to a temperature sufficient to cause exothermic oxidation (combustion) of the carrier material. Combustion of the carrier generates intense, short-lived local temperature gradients in the surrounding gas phase thereby inducing formation of ultrafine ceramic particles from the ceramic precursors. The very high temperature favors formation of crystalline structure in the ceramic particles and the short duration of combustion ensures that agglomeration does not occur. Thus, pure, crystalline, nanometer sized (e.g., about 10 nm to 100 nm) ceramic particles are formed.

The first step in the process comprises forming an intimate mixture of carrier material and a ceramic precursor material. The mixture preferably is formable into discrete droplets or particles. The carrier material can be any combustible organic or carbonaceous material, i.e., any carbon or carbon-hydrogen based material which reacts exothermically with oxygen. Exemplary carriers include carbon, carbon-based synthetic or natural polymers, carbohydrates such as sugars and other organic materials. The ceramic precursor can be any material which forms a ceramic under oxidizing conditions. Exemplary ceramic precursors include metals, metal oxides, metal salts and other metal compounds. Mixtures of metals, metal salts, metal oxides or metal compounds can be used to produce heterogeneous powders. Metallic precursor compounds comprising two or more metals can be used to form multicomponent powders. Inorganic materials, i.e., those lacking hydrocarbon components, are preferred, but organometallic compounds, such as zirconium acetate, can be used.

The mixture of carrier and precursor can be formed in a number of ways, including, for example, dissolving or dispersing the precursor into a solution or dispersion of the carrier and mixing together until an intimate mixture is obtained; adsorbing precursors onto a porous carbon or organic matrix; or polymerizing organic monomers in the presence of precursors thereby forming polymer molecules containing the precursor. Liquid carrier/precursor mixtures or dispersions can be dried by spraying, air drying or other method which results in discrete droplets or particles. Solid mixtures can be ground, if necessary, to form fine particles or powders. The preferred ratio of carrier to precursor is in the range of about 10:1 to about 100:1 on a weight basis.

In the second step, the carrier/precursor mixtures are introduced into a high temperature environment, such as a flame zone, furnace or other high temperature reactor. The high temperature environment may be externally heated, preheated, flame heated or flame. The mixture preferably is introduced as an aerosol or fine spray, e.g., by forcing through a nozzle, by atomization or other method. The temperature environment should be sufficiently high to cause the organic carrier to ignite and react exothermically (i.e., combustion). The high temperature environment preferably comprises a temperature at least 1000K and an atmosphere of at least 20% (by volume) oxygen. The currently most preferred temperature range for most applications of the present process is from about 1200K to about 1500K. However, higher or lower temperatures may be preferred for certain specific embodiments. The overall residence time in the high temperature environment typically is less than 5 seconds, preferably about 2-3 seconds. The residence time of the formed ceramic particles in the actual combustion zone is believed to be less than about 50 μs.

Following ignition of the carrier, a small combustion zone is created in the immediate vicinity of the carrier. The elevated temperatures associated with combustion cause the ceramic precursors associated with the organic material to either (a) decompose, vaporize, and diffuse away from the burning particles (referred to as the ceramic vapor pathway), or (b) diffuse away from the burning particles by convective flow (referred to as the colloidal pathway). Once these vapors or colloids encounter the surrounding oxygen-rich gases, the controlling physical phenomena differ slightly for each pathway, however, no differences in the product are noted. These two pathways are described below.

Ceramic Vapor Pathway

Upon encountering the gases surrounding the combustion zone, the ceramic vapors oxidize, forming relatively low vapor pressure species. The resulting supersaturation of the ceramic oxide is relieved by homogeneous nucleation, generating a large number of ultrafine ceramic oxide particles. The resulting nanophase particles are rapidly transported across the high temperature thermal boundary region by convective flow and diffusion into the cooler surrounding bath gas. For example, for 10 nm ceramic particles near a reacting 20 μm carrier particle, less than 50 μs are required to traverse the high temperature boundary region surrounding the combustion zone. If bulk gas ("bath" gas) temperatures are kept sufficiently low relative to the sintering temperatures of the ceramic material, limited growth by coagulation, coalescence, and/or condensation can occur only within the thermal boundary region of the burning carrier particles, where the particles reside for a very short time. Ceramic oxide particles in the 10–100 nm range are the net result.

Colloidal Pathway

Once colloids are rapidly convected out of the region of the reacting organic carrier droplets, they will oxidize, if necessary (i.e., if they already do not exist as metal oxides). If they already are stable oxides, no further oxidation will occur. The resulting nanophase particles are rapidly transported across the high temperature thermal boundary region by convective flow and thermopheresis into the cooler surrounding bath gas. As in the ceramic vapor pathway, 10 nm ceramic particles near a reacting 20 μm carrier particle require less than 50 μs to traverse the high temperature boundary region. If bulk (bath) gas temperatures are kept sufficiently low relative to the sintering temperatures of the ceramic material, limited growth by coagulation, coalescence, and condensation can occur only within the thermal boundary region of the carrier particles. The particles' short residence time within this boundary region ensures that such growth is minimized. Ceramic oxide particles in the 10–100 nm range also result from this pathway.

One embodiment of the present process is shown schematically in FIG. 1. As illustrated therein, an organic carrier solution containing dissolved or dispersed (colloidal) ceramic precursors is sprayed into a low temperature vessel where the organic aerosol droplets are dried rapidly. Depending upon the organic carrier chosen, mild carbonization may occur. The aerosol stream then flows into the high temperature reaction vessel, where the organic carrier aerosol particles ignite and react exothermically. The ceramic precursor vaporizes and diffuses away from the combustion zone, where it nucleates to form ceramic particles.

In another embodiment of the process, the organic carrier material and the ceramic precursor are combined to form a mixture which is dried to a solid. The solid mixture is ground to a powder, preferably comprising particles having an average diameter of less than about 100μ. The powder is atomized or sprayed in aerosol form into a high temperature reactor inducing combustion of the organic material and resulting in formation of crystalline, nanoscale ceramic particles.

The process has successfully produced nanophase (20 nm) magnesium oxide and (15 to 30 nm) zirconium oxide. Nanophase yttria-stabilized zirconium oxide also has been produced, demonstrating the feasibility of producing multicomponent powders via this process. A wide variety of crystalline nanophase powders can be manufactured according to present invention, including but not limited to:

| | |
|---|---|
| $TiO_2$ | $BaTiO_3$ |
| $Fe_3O_4$ | $Pb(Zr,Ti)O_3$ (PZT) |
| $Fe_2O_3$ | mullite |
| $Al_2O_3$—$ZrO_2$ | stabilized $ZrO_2$ |
| barium ferrite | MgO | and many others.

The process described herein may also, with some modification, be used to produce other classes of nanophase ceramic compounds such as carbides. Oxidation of the carrier aerosol would not occur in these applications of the process, nor would an oxygen containing carrier compound be used. Instead, polymeric carbons would serve as the carrier material, and an inert or reducing gas environment would be used. Reaction to produce the ceramics might occur between the solid carbon in the carrier and the condensed phase precursor; between the vapor phase of the carbon and the condensed phase of the precursor; between the condensed phase of the carbon and the vapor phase of the precursor; or between the vapor phase of the precursor and the vapor phase of the carbon. Reaction would occur in a high temperature environment as described hereinabove.

Nanoscale ceramic particles produced according to the present process can be used to make high performance ceramic materials for microelectronics, biotechnology and engineering applications. Ceramic materials typically are made by molding the ceramic powders and sintering the molded article at high temperatures to densify the ceramic. Ceramic powders having a small, uniform particle size permit closer packing, thus, the sintered body has smaller residual pores and fewer voids. Nonuniform particle size, the presence of agglomerated particles and impurities in the powder make sintering more difficult and require higher sintering temperatures resulting in formation of internal flaws and voids which weaken the final ceramic structure. The present pure, crystalline unagglomerated ceramic powder sinters at a lower temperature, and the small particle size and uniform particle size distribution allows it to compact well and minimizes the occurrence of voids. Thus, high integrity, high performance ceramics having excellent structural characteristics can be produced.

The invention will be further illustrated by the following non-limiting examples.

EXAMPLES

Example 1

Production of Nanophase Magnesium Oxide Using Solidified Polyfurfuryl Alcohol Carrier Particles This example demonstrates the use of polymerized organic carriers and soluble ceramic precursors to produce nanophase ceramics. A soluble ceramic precursor is dissolved in a liquid organic matrix, the matrix is solidified, and the resulting carrier/precursor material is ground to form solid organic particles.

Five hundred milliliters of furfuryl alcohol were placed in a 1000 ml separatory funnel, itself placed within a temperature controlled 60° C. water bath. Under constant stirring, 11.94 grams of magnesium nitrate, $Mg(NO_3)_2 6H_2O$, per 100 ml furfuryl alcohol were dissolved in the alcohol to produce a solution containing 1 wt % magnesium. Seven and four tenths (7.4) ml of an initiator consisting of 0.4 grams of p-toluenesulfonic acid (PTSA) per 10 ml distilled water, were then added per 100 ml alcohol, 5 ml at a time. This polymerization procedure was based upon work described by Levendis in "A Fundamental Study of Char Oxidation Kinetics Using Model Materials", a doctoral thesis available from California Institute of Technology, Pasadena, Calif. (1988). After allowing 1 hour for polymerization, the polymerizing solution was drained into ceramic crucibles for overnight curing under flowing air at 120° C., followed by carbonization in nitrogen for 1 hour at 550° C. Upon cooling to room temperature, the resultant char was removed from the reactor, pulverized in a standard household coffee bean grinder, and size fractionated to a 38 to 53 $\mu m$ cut using dry shaker sieves. A glassy carbon morphology resulted, as temperatures were too low for significant graphitization to occur.

The size-classified organic carrier particles were then fed to an externally heated laminar flow furnace for generation of the nanophase MgO particles. The reactor first was heated to temperatures of 1375K to 1500K with oxygen concentrations of 21–100%. Bulk gas containing 21 to 100% oxygen in nitrogen flowed into the reactor at rates of either 28.3 or 42.4 standard liters per minute (slpm). Flow rates were held constant during an individual experiment. An aerosol of the magnesium-organic carrier particles was introduced at particle feed rates of 0.13 to 0.18 grams per minute. Upon entering the reactor, the carbonaceous carrier particles ignited and burned to completion. The magnesium contained within the carrier particles vaporized, diffused away from the burning particle surface, oxidized, and nucleated to form nanophase ceramic oxide particles. Limited growth through coagulation and condensation occurred as the ceramic particles traversed the high temperature boundary region surrounding the burning carrier.

Ceramic particles thus generated were collected at the completion of carrier heat-up and combustion (after approximately 2 s residence time in the furnace) by deposition 200 mesh carbon-coated copper transmission electron microscope (TEM) grids (Ladd Research Industries, Burlington, VT), using a TSI Model 3100 electrostatic aerosol sampler (TSI, St. Paul, Minn.). TEM micrographs of structures encountered in these experiments at 1500K, 100% oxygen showed that particles were crystalline in all cases, based upon the electron diffraction patterns obtained on the TEM. Number-average particle sizes ranged between 10 and 19 nm, as shown in Table 1.

TABLE 1

| MgO Powder Size Summary | | |
|---|---|---|
| Temperature (K.) | Oxygen (%) | Dp, Number Average (nm) |
| 1500 | 100 | 10.9 ± 2.7 |
| 1500 | 50 | 17.8 ± 8.6 |
| 1500 | 50 | 17.0 ± 6.4 |
| 1500 | 21 | 16.5 ± 3.7 |
| 1375 | 100 | 15.9 ± 6.5 |
| 1375 | 50 | 18.7 ± 7.7 |

Figure 2:
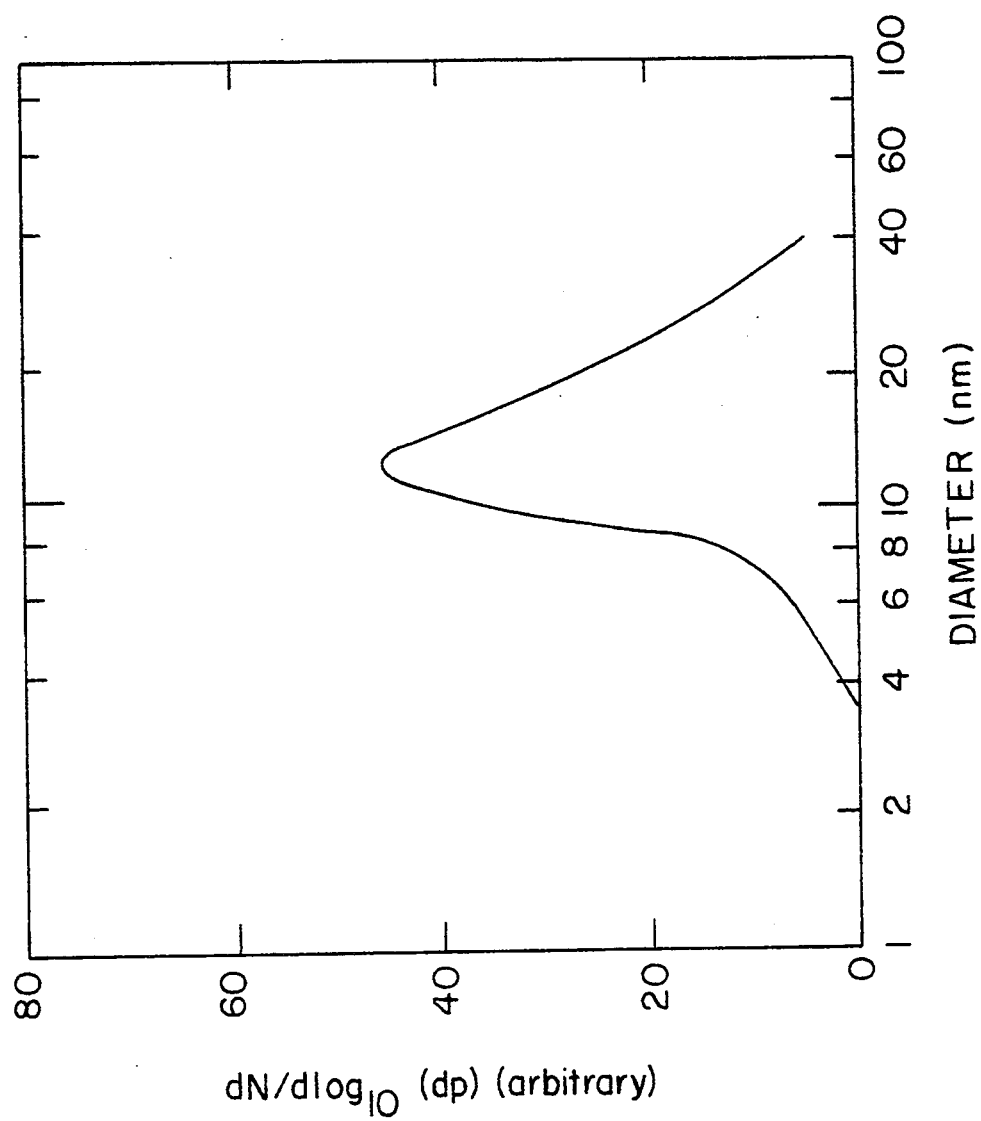
FIG. 2 is a graph showing the size distribution of MgO particles produced by combustion of a carrier material at 1375K in a 100% $O_2$ atmosphere.

Narrow particle size distributions (psd) with narrow standard deviations ($1\sigma$) were obtained in all cases. The psd of particles obtained by this process at 1375K bath gas temperature and 100% oxygen, is shown graphically in FIG. 2.

Measurements of process yield were conducted at 1500K in 100% oxygen for this system. Yield was determined by isokinetically sampling nanophase particles from the bulk gas stream and passing the sample through a Mark III cascade impactor (Pollution Control Systems Corp., Seattle Wash.) for on-line aerodynamic size classification of the ceramic clusters. Impactor stages were coated with low volatility perfluorinated hydrocarbon grease (Fomblin Y-VAC 3, Montefuous Gruppo Ausimont, Milan, Italy) to avoid problems associated with particle bounce. Defining the acceptable yield as the mass fraction of nanophase particle clusters possessing an aerodynamic diameter $<1$ $\mu m$, a yield of $>60\%$ was obtained in a single measurement under these conditions.

Example 2

Nanophase Magnesium Oxide Production Using Solid Commercial Porous Carbon Carrier Particles This example demonstrates use of solid carbonaceous carriers and dispersed ceramic precursors to produce nanophase ceramics.

Nanophase crystalline magnesium oxide (MgO) particles were generated using commercially available solid-phase carbon particles as the carrier matrix. Spherocarab TM (Phase-Sep/Analabs, New Haven Conn.), highly porous, spherical, 125/150 μm carbon particles were immersed in a 5 wt % solution of magnesium nitrate in distilled water in a laboratory crystallizing dish. The resultant slurry was stirred using a teflon-coated stir bar and a magnetic stirrer for 2 to 3 hours. After stirring, the slurry was heated gently on a hot plate to slowly evaporate the water, producing carbon particles containing magnesium adsorbed on the pore wall surfaces.

The carbon carrier particles were fed to an externally heated laminar flow furnace for generation of the nanophase MgO particles. The reactor was heated to 1500K. Bulk gas containing 21-100% oxygen, was introduced at a flow rate of 28.3 or 42.4 standard liters per minute (slpm) which was held constant during an individual experiment. An aerosol of the carbon-magnesium carrier particles was introduced at particle feed rates of 0.13 to 0.18 grams per minute. Upon entering the reactor, the carbonaceous carrier particles ignited and burned to completion. The magnesium contained within the carrier particles then either vaporized or was carried away from the surface by convective and diffusive flow, diffused away from the burning particle surface, oxidized, and nucleated to form nanophase ceramic oxide particles. Limited growth through coagulation and condensation occurred as the ceramic particles traversed the high temperature boundary region surrounding the burning carrier.

Ceramic particles thus generated were collected at the completion of carrier heat-up and combustion (after approximately 2 s total residence time) by deposition on 200 mesh carbon-coated copper transmission electron microscope (TEM) grids (Ladd Research Industries, Burlington Vt.), using a TSI Model 3100 electrostatic aerosol sampler (TSI, St. Paul, Minn.). TEM showed that crystalline particles were obtained under all conditions. Number-average particle sizes ranged between 11 and 16 nm with narrow standard deviations ($1\sigma$), as shown in Table 2.

TABLE 2

| MgO Powder Size Summary | | |
|---|---|---|
| Temperature (K.) | Oxygen (%) | Dp, Number Average (nm) |
| 1500 | 100 | 11.2 ± 2.4 |
| 1500 | 50 | 15.5 ± 5.3 |
| 1500 | 21 | 13.8 ± 4.0 |

Figure 3:
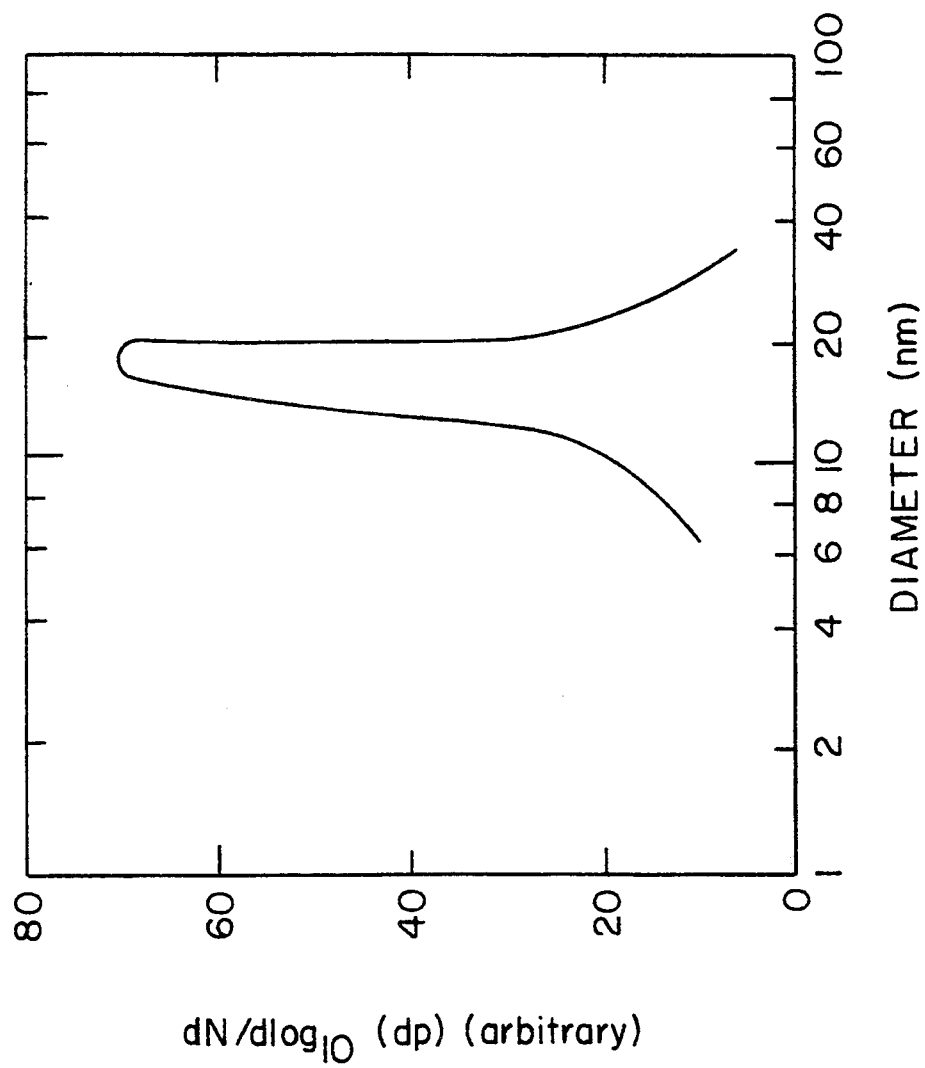
FIG. 3 is a graph showing the size distribution of MgO particles produced by combustion of a porous carbon carrier matrix at 1500K in a 50% oxygen atmosphere.

Narrow particle size distributions (psd) were obtained in all cases. The psd of particles obtained from ceramic production at 1500K bath gas temperature and 50% oxygen is shown graphically in FIG. 3.

Example 3

Nanophase Magnesium Oxide Production Using Sucrose/Water Solution Carrier Droplets This example demonstrates use of liquid organic carriers and soluble ceramic precursors to produce nanophase ceramics.

Nanometer scale ceramic oxide particles were produced by dissolving a soluble ceramic precursor in an organic liquid and spraying the matrix material into a high temperature oxidizing environment. Nanophase crystalline magnesium oxide particles were generated in a continuous spray process using liquid organic droplets as the carrier medium. Powder generation experiments were conducted in an externally-heated, continuous-flow reactor.

An external-mix, round spray siphon nozzle (Model 156.330.16.06 Lechler, St. Charles, Ill.), was used to introduce the organic liquid and precursor solution to the reactor, primarily because it was capable of spraying small volumes (1 cm$^3$/min) of highly viscous liquid with minimal atomizing gas. For the sucrose water solutions used to generate the carrier aerosol, viscosities approached 82 centipoise (cP) at room temperature; heating to 70° C. decreased the viscosity to approximately 33 cP. Lewis-Squires approximation was used to determine temperature variation of viscosity. Reid et al., (1977) *In: The Properties of Gases and Liquids*, McGraw-Hill, New York, N.Y. To ensure efficient atomization during an experiment, a pneumatically operated clean out valve with timing circuit operating at 3 Hz was added. Using a commercial laser scattering device (Insitec PCSV-P, Insitec, San Ramon, Calif.) to measure particle size off-line, a Sauter mean diameter of 18 μm was determined for the carrier droplets.

Figure 4:
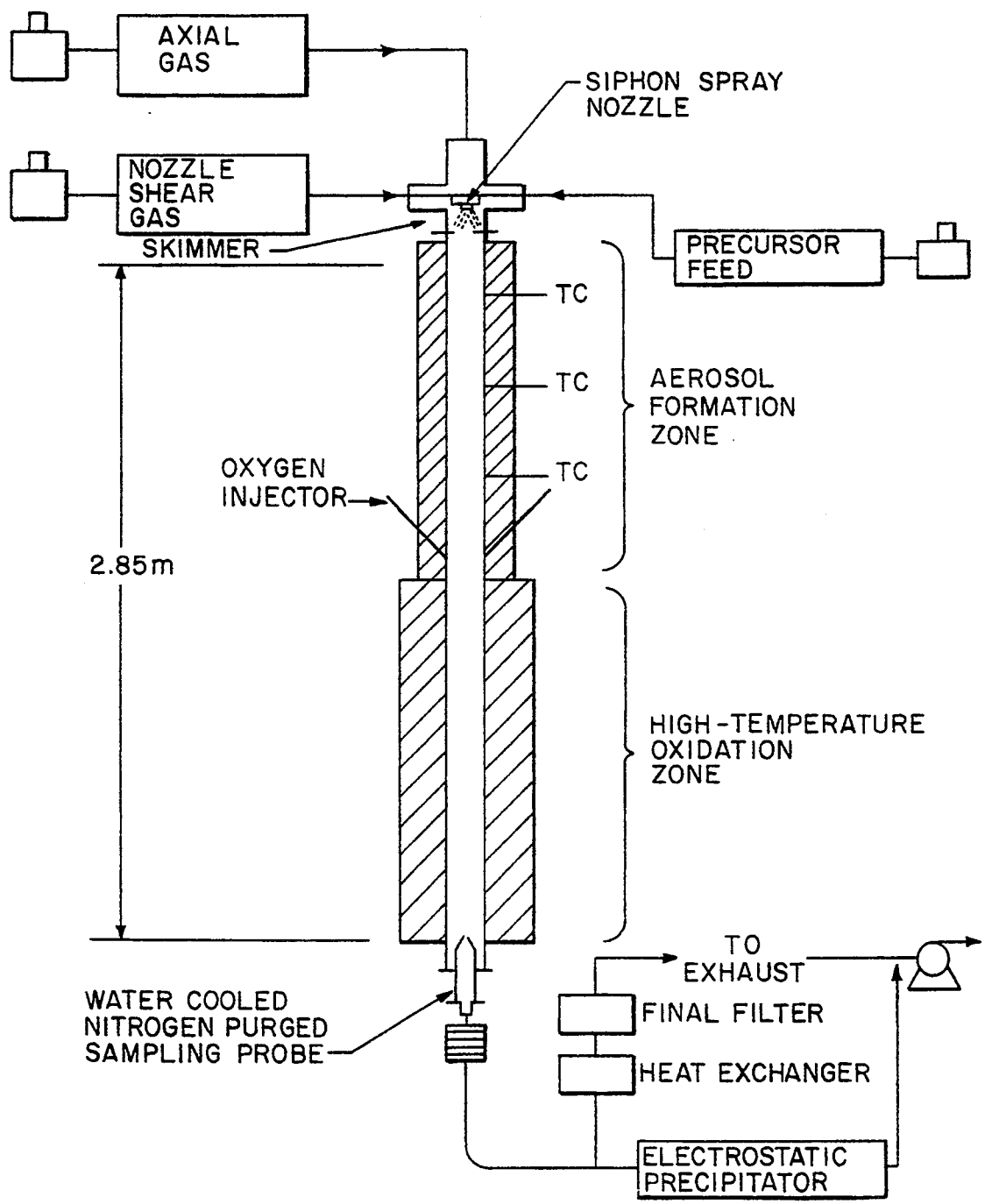
FIG. 4 is a schematic illustration of a reactor which can be used to produce nanoscale ceramic particles according to the present process.

The reactor is shown schematically in FIG. 4. It comprised a 2.85 m-long, two-stage system consisting of two electrically heated segments, a low temperature carrier aerosol formation and drying section of 316 stainless steel (upper section), and a high temperature ceramic powder formation section made of mullite. As shown in FIG. 4, each section was 1.43 meters in length with an interior diameter of 8.57 cm (3.75 in). The stainless steel upper segment consisted of three independently controlled electrically heated zones, each heated by a single Thermolyne ™ heavy duty heat tape (2.5×72 in,; 1410W) capable of a maximum temperature of 773K. A 5.0 cm thickness of Cer-Wool ™ insulation (Premier Refractories, King of Prussia, Pa.) was used to insulate the upper portion of the reactor and minimize heat loss. The temperature of each zone was monitored by individual K-type chromel-alumel thermocouples. A Series 2000 three zone temperature controlled ceramic furnace (Applied Test Systems, Inc., Butler, Pa.) with a maximum operating temperature of 1573K formed the high temperature segment of the aerosol reactor.

Reactant gas entered the system through several ports. Atomizing gas, either oxygen or nitrogen, was heated to 70° C. by heating tapes and then enters the upper reactor system through the spray nozzle.

Primary reactant gas, either oxygen or nitrogen, also entered the upper reactor as an unheated axial flow which passes through a ceramic honeycomb flow straightener located immediately above the spray nozzle. The remainder of the reactant gas is directly injected into the lower reactor. Oxygen feed gas into the injectors is electrically heated by 36 ft. of heating cord (828W) before entering the reactor. The temperature measured at the injector exhaust (K-type chromel-alumel thermocouple) is typically about 523K to 573K. Total reactor gas flow rates are varied between 21 and 42 slpm resulting in total process residence times of 2.1 to 4.2 s.

At the exit of the reactor, particles were sampled isokinetically through a 2.54 cm diameter water-cooled, nitrogen-quenched sampling probe. Cooling rates of approximately $5\times10^{3}$ K/s were achieved in the probe. Coagulation was minimal as only 1 to 2 collisions per 10 nm particle occur within the sampling probe.

To generate nanophase MgO powders with this continuous flow spray system, magnesium precursor solutions were prepared by dissolving magnesium nitrate hexahydrate (Mg(NO$_3$)$_2$6H$_2$O) (Aldrich, chemical purity=99.995%) and high purity sucrose (Aldrich, 99+% purity) in doubly distilled deionized water (Poland Springs Co., Poland Springs, Me.), having <1.3 mg/l total dissolved solids and bicarbonates. Sucrose represented 62% by weight of the precursor solution; the magnesium within the magnesium nitrate represented 1% by weight.

The solution was then sprayed into the reactor. Overall gas flow rates of 42.5 and 21.2 slpm were considered in these experiments, split evenly between the upper and lower reactor sections. Thus, a total residence time of either 2.1 or 4.2 s was provided. Oxygen was 100% of the gas flow for these runs.

Particle sizing results (including a $1\sigma$ standard deviation) are presented in Table 3.

TABLE 3

| MgO Particle Sizing Summary | | | |
|---|---|---|---|
| Temperature (K.) | Oxygen (%) | Residence Time (s) | Number average dp (nm) |
| 1500 | 100 | 4.2 | 19 ± 8 |
| 1500 | 100 | 2.1 | 21 ± 13 |

Residence times reflect the time spent in the flow reactor, not the time in the high temperature boundary region which must be minimized to avoid excessive coagulation. Number-average particle sizes are comparable to those obtained in the batch process described in examples 1 and 2.

Figure 5:
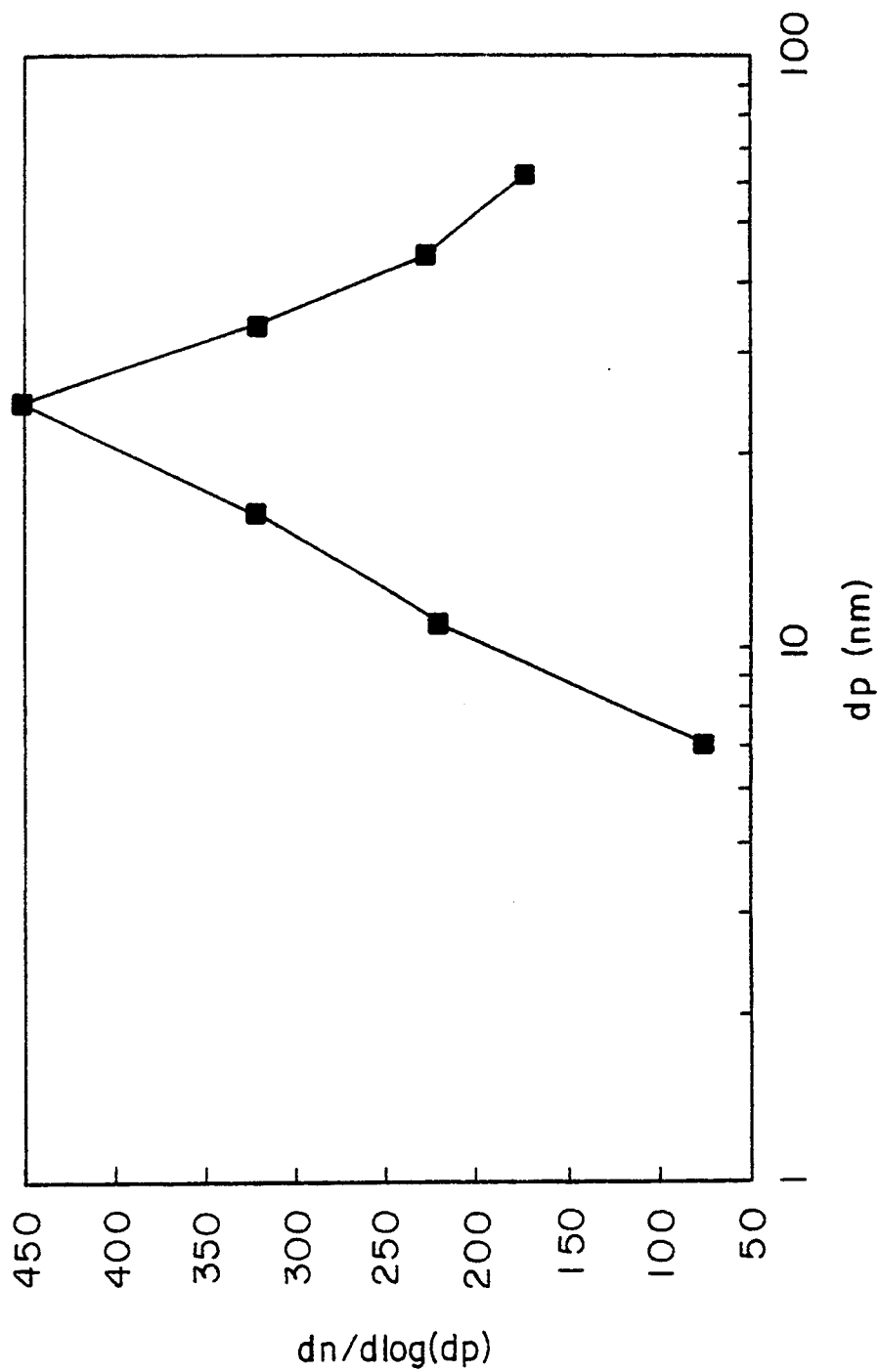
FIG. 5 is a graph showing the distribution of MgO particles obtained by combustion of a carrier matrix at 1500K, in a 100% oxygen atmosphere with an overall residence time of 2.1 seconds.

A particle size distribution for the 2.1 s residence time run is shown in FIG. 5.

Example 4

Nanophase Zirconium Oxide Production Using Sucrose/Water Solution Carrier Droplets Zirconium precursor solutions were prepared in the same manner as the magnesium precursor solution described in Example 3. One of four zirconia precursors (Table 4) was dissolved to completion in doubly distilled deionized water (Poland Springs Co.). High purity sucrose was added to the solution and heated on a stir/hot plate to 70° C. to effect complete solvation. Precursor addition corresponded to either 1,3, 6 or 10% zirconium metal by weight in the final solution. Sucrose addition was sufficient to produce a 62 wt % sucrose solution.

TABLE 4

| Zirconium Precursors Studied | | |
|---|---|---|
| Material | Vendors | Formula |
| Zirconyl chloride octahydrate | Aldrich 98% | $ZrOCl_2 8H_2O$ |
| Zirconium (IV) chloride octahydrate | Aldrich 99.5+% | $ZrCl_4 8H_2O$ |
| Zirconyl nitrate hexahydrate | Aldrich 99% | $ZrO(NO_3)_2 6H_2O$ |
| Zirconium acetate | Magnesium Elektron | $Zr(CH_3COO)_4$ |

Several operational parameters were explored to determine optimum conditions for the production of crystalline nanometer-sized ceramic $ZrO_2$ particles, including reactor temperature profile, oxygen concentration in the gas phase, total gas flow rate, precursor type and precursor loading. A drying and carbonization temperature range of 300° to 350° C. in the upper reactor was chosen as the maximum temperature to minimize premature decomposition and vaporization of the precursors. To achieve complete oxidation of both the sucrose carrier and zirconium precursor in the lower reactor, 1250K was chosen as the minimum temperature required; 1500K was also considered. Oxygen levels explored in the high temperature oxidation zone were 50, 75 and 100% $O_2$ in $N_2$. Total residence times examined included 4.2, 3.1, and 2.1 s, corresponding to gas flow rates of 21.2, 28.3, and 42.5 slpm, respectively. In all cases, grain and cluster size were determined from TEM micrographs. Between 200 and 400 grains were measured per experimental condition.

Figure 7:
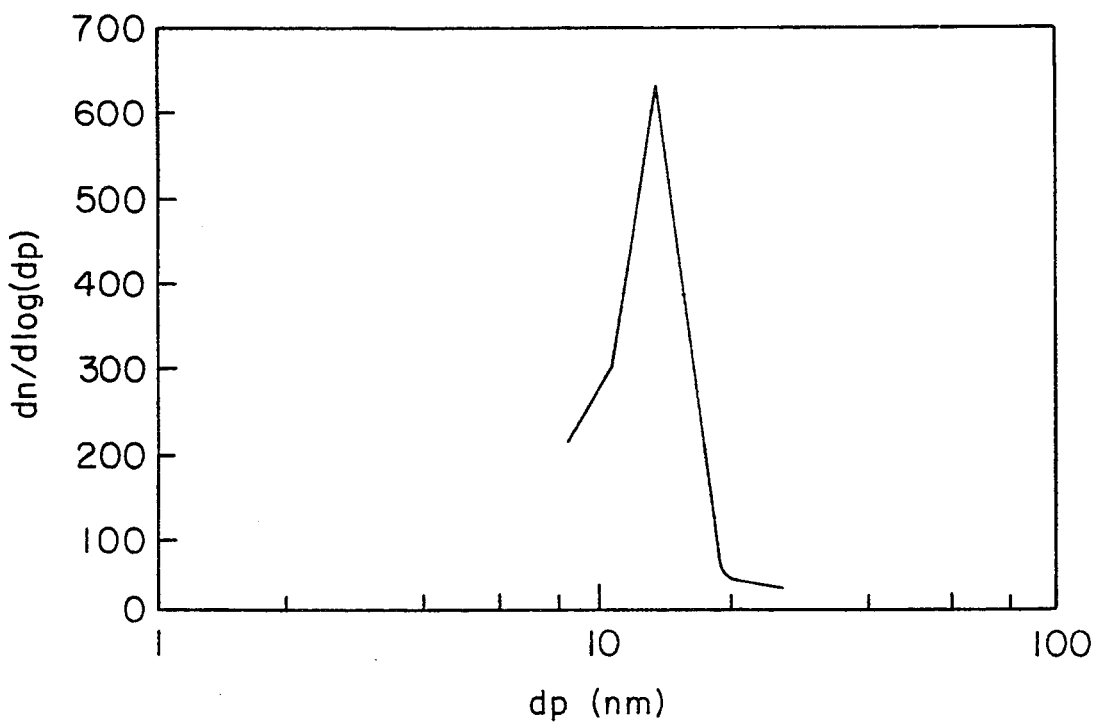
FIG. 7 is a graph showing the distribution of $ZrO_2$ particles produced from a $ZrOCl_2$ precursor in a 75% oxygen atmosphere at 1500K for 2.1 seconds.
Figure 8:
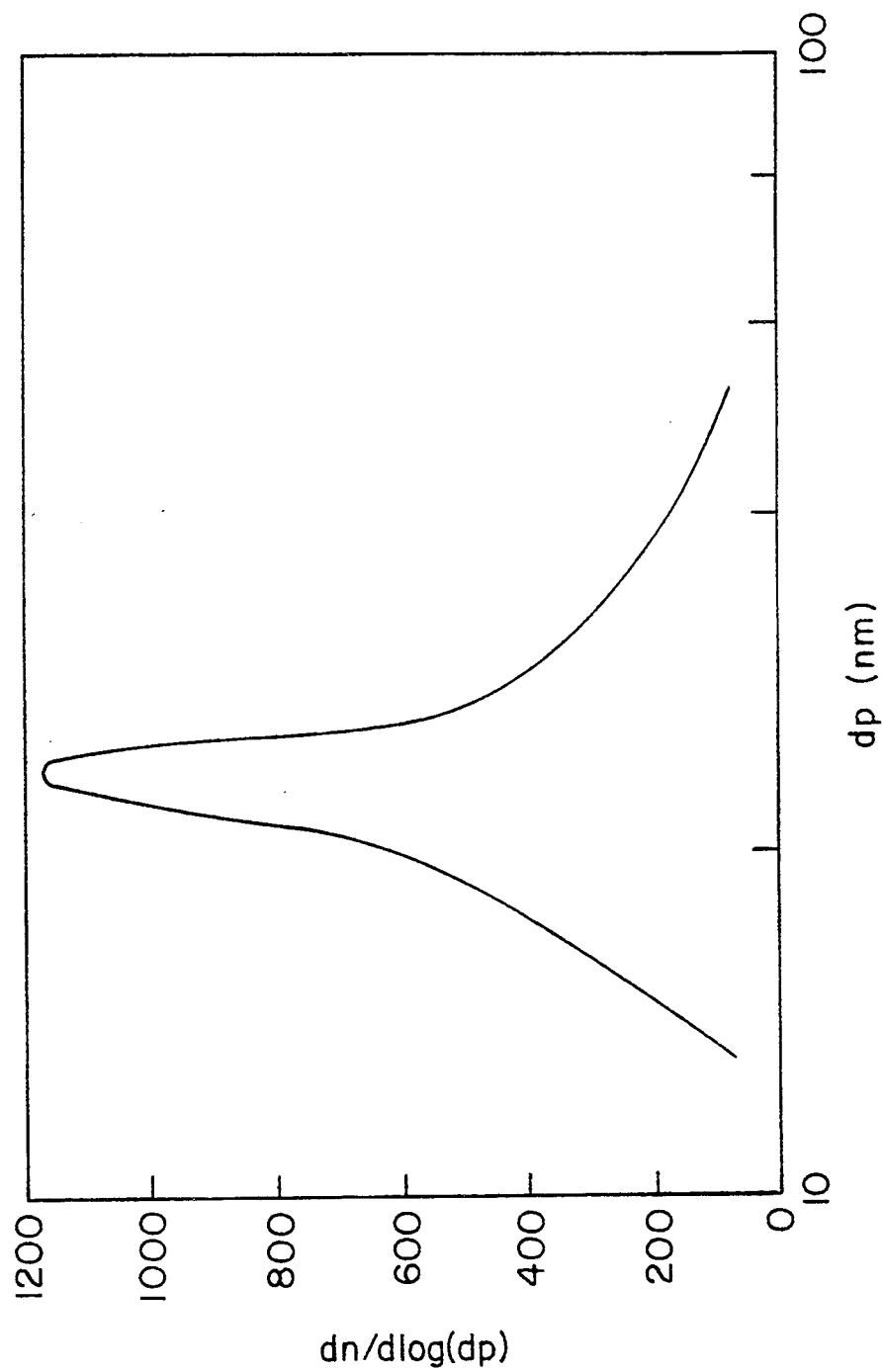
FIG. 8 is a graph illustrating the particle size distribution of $ZrO_2$ particles produced from a $ZrOCl_2$ precursor in a 100% oxygen atmosphere at 1500K and 3.1 second residence time.

Examples of the particles produced from the zirconyl chloride precursor in 100% oxygen at two different residence times are shown in FIGS. 7 and 8. Zirconium concentrations in the precursor solution were 1% by weight for these trials. Uniformly-sized grains of approximately 20 nm were obtained in both runs. Cluster diameters varied from 50 to 500 nm. Production at 3.1 s overall residence time (FIG. 8) resulted in a number average grain diameter of 19±8 nm, while powder generation at 2.1 s yielded a number average grain diameter of 15±8 nm. At a residence time of 4.2 s the number average diameter was 27 nm. These differences suggest that increasing residence time may allow the grains to coalesce further, producing the observed increase in grain size. Coagulation is not believed to be responsible, as coagulation of clusters would increase the cluster size and would not affect the overall grain size.

Similar results were observed under 75% oxygen conditions for the $ZrOCl_2$ precursor at 1% zirconium loading. At a residence time of 4.2 s the number average grain diameter was 21±7 nm. At a residence time of 2.1 s, the average diameter was 12±3 mn. Under 50% oxygen conditions, the same trend was observed: 21±14 nm at 2.1 s; 26±12 nm at 4.2 s. Under all oxygen conditions, therefore, increasing residence time increased the average size of the nanophase $ZrO_2$ grains produced. Reducing bath gas temperature to 1250K had a slight effect, causing a reduction in average grain size from 19 to 15 nm.

The reproducibility of the data was explored by repeating powder generation with 1% zirconyl chloride precursor loading. Two conditions were explored. An oxygen level of 75%, a bath gas temperature of 1500K, and residence times of 2.1 and 4.2 s were considered. At the longer residence time, number average grain sizes of 21±7 nm were measured in the first experiment, with 18±5 nm measured in the repeat trial. At a residence time of 2.1 s, the first and second experiments yielded average grain sizes of 12 and 15 nm, respectively. Reproducibility therefore appears to be approximately 20%, smaller than the standard deviation of the mean for any individual run.

Nitrate, chloride, and acetate precursors were also utilized to produce zirconia nanophase powder. Average grain sizes were similar for all precursors considered. In trials using higher zirconyl chloride precursor loadings, particle sizes remained in the nominal 20 nm range.

Zirconia particle sizing results from all of the experiments discussed in this example are summarized in Table 5.

TABLE 5

| Summary of Zirconia Particle Sizing Results | | | | | |
|---|---|---|---|---|---|
| Precursor | Loading (%) | Temp. (K.) | $O_2$ (%) | Res. t (s) | no. − avg dp (nm) |
| $ZrOCl_2$ | 1 | 1500 | 100 | 4.2 | 27 ± 20 |
| $ZrOCl_2$ | 1 | 1500 | 100 | 3.1 | 19 ± 8 |
| $ZrOCl_2$ | 3 | 1500 | 100 | 3.1 | 18 ± 7 |
| $ZrOCl_2$ | 6 | 1500 | 100 | 3.1 | 25 ± 12 |
| $ZrOCl_2$ | 10 | 1500 | 100 | 3.1 | 25 ± 8 |
| $ZrOCl_2$ | 1 | 1500 | 100 | 2.1 | 15 ± 8 |
| $ZrOCl_2$ | 1 | 1500 | 75 | 2.1 | 12 ± 3 |
| $ZrOCl_2$ | 1 | 1500 | 50 | 2.1 | 21 ± 4 |
| $ZrOCl_2$ | 1 | 1500 | 75 | 4.2 | 21 ± 7 |
| $ZrOCl_2$ | 3 | 1500 | 50 | 4.2 | 26 ± 12 |
| $ZrOCl_2$ | 1 | 1250 | 100 | 3.1 | 15 ± 8 |
| $ZrOCl_2$ | 3 | 1250 | 100 | 2.1 | 13 ± 10 |
| $Zr(CH_3COO)_4$ | 1 | 1500 | 100 | 2.1 | 13 ± 4 |
| $ZrCl_4$ | 1 | 1500 | 100 | 2.1 | 25 ± 17 |
| $ZrO(NO_3)_2$ | 1 | 1500 | 100 | 2.1 | 11 ± 5 |

Figure 6:
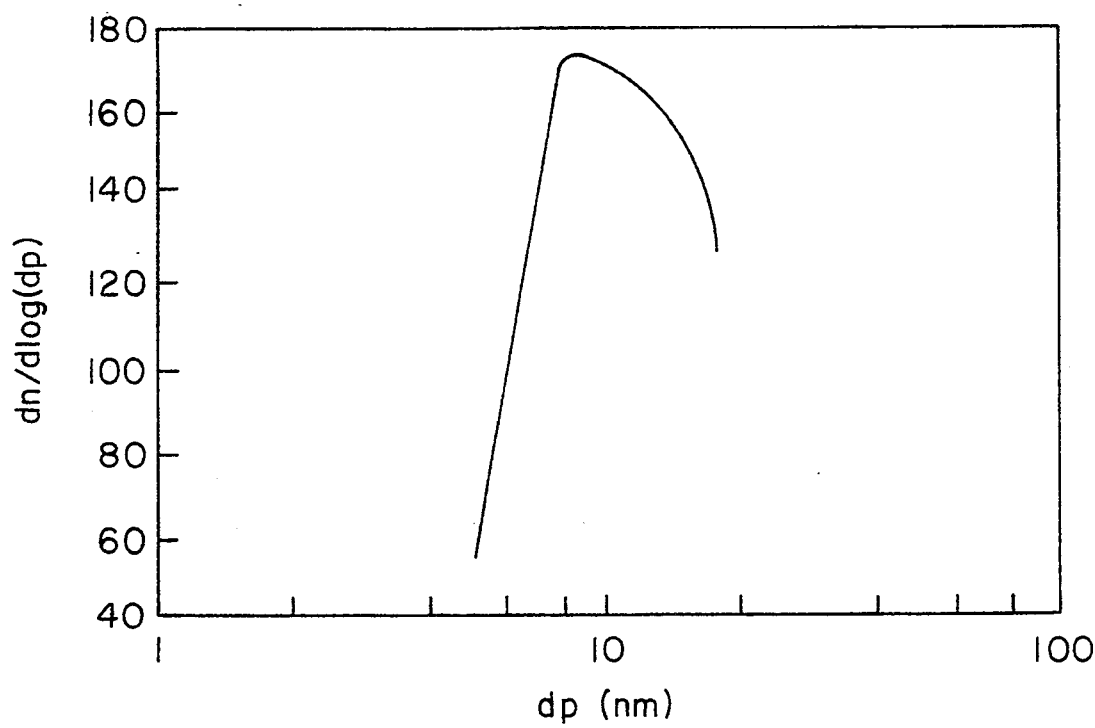
FIG. 6 is a graph showing the distribution of zirconia ($ZrO_2$) particles produced from a $ZrO(NO_3)_2$ precursor in a 100% oxygen atmosphere at 1500K with a 2.1 second residence time.

Narrow particle size distributions were obtained in all cases. This is illustrated graphically for selected precursors and conditions in FIGS. 6, 7 and 8.

Transmission electron microscope (TEM) generated electron diffraction (ED) patterns (200 kV; 70 kx) were used to identify the crystal phase of zirconia particle samples. With the assumptions that for very small values of Bragg angle Θ the camera distance L is equal to the length of the diffracted beam, crystal phases can be determined.

Because of the small number of crystalline particles (grains) exposed to the electron beam in any TEM ED image, dot patterns were collected instead of the more familiar ring patterns. Measurements could still be obtained on these patterns by locating two dots equally displaced from the center beam spot on an ED micrograph, measuring the total distance (diameter), and dividing by two to obtain r (radius). Phases were identified in all cases by matching the four main lines listed on the Joint Committee on Powder Diffraction Standards 1988 (JCPDS) file cards for the appropriate phase.

Oxides of zirconium were the expected products, given the processing conditions employed in this study. Equilibrium predicts that the monoclinic phase is the only stable room temperature phase in the absence of stabilizing agents such as yttria or calcia. Because of the small size of the particles and high quench rates of this process, the appearance of other phases was considered possible. While the room temperature monoclinic phase is relatively easy to distinguish, the other phases' diffraction lines show considerable overlap. The presence of the 2.60A line, in the tetragonal phase was used to distinguish it from the cubic phase.

Diffraction results are summarized in Table 6.

TABLE 6

Crystal Phases Identified by Electron Diffraction for Selected Zirconia Samples

| Precursor | Conditions (s) | Phases* |
|---|---|---|
| $ZrOCl_2$ | 100% $O_2$, 2.1 | T |
| $ZrOCl_2$ | 75% $O_2$, 2.1 | T,M |
| $ZrOCl_2$ | 75% $O_2$, 4.2 | T,M |
| $ZrOCl_2$ | 50% $O_2$, 2.1 | T |
| $ZrOCl_2$ (3%) | 100% $O_2$, 3.1 | T |
| $Zr(CH_3COO)_4$ | 100% $O_2$, 2.1 | T |
| $ZrCl_4$ | 100% $O_2$, 2.1 | T,M |

*T = tetragonal, M = monoclinic

In most cases, the high temperature tetragonal phase was synthesized and remained stable at room temperature. In other cases, a mixture of monoclinic and tetragonal phases resulted. The exact proportion of each was uncertain because both crystal phases have the same four major d-spacings which differ only in intensity. The possible existence of tetragonal zirconia is a unique and unusual result.

Process yield, defined as the fraction of zirconium precursor converted to nanophase powder clusters with an aerodynamic diameter less than 1000 nm (1 $\mu$m) was also determined. Processing conditions for these measurements were 100% oxygen, 1500K, 2.1 s total residence time. Zirconyl chloride was used as the precursor in all cases. Yield was measured by summing the mass fraction of powder collected on Stages 4–7 (plus filter) of the Pollution Control Systems Corporation Mark III cascade impactor described previously in Example 1. Results of these measurements are given in Table 7.

TABLE 7

$ZrO_2$ Yield Measurements (weight % of total $ZrO_2$)

| | 1% Precursor | 3% Precursor | 6% Precursor | 10% Precursor |
|---|---|---|---|---|
| Filter | 8 | 7 | 6 | 4 |
| Stage 7 | 8 | 3 | 1 | 2 |
| Stage 6 | 14 | 14 | 9 | 7 |
| Stage 5 | 26 | 22 | 21 | 16 |
| Stage 4 | 28 | 24 | 27 | 23 |
| Accept. Total | 84 | 70 | 64 | 52 |

TABLE 7-continued $ZrO_2$ Yield Measurements (weight % of total $ZrO_2$)

| | 1% Precursor | 3% Precursor | 6% Precursor | 10% Precursor |
|---|---|---|---|---|
| >1 $\mu$m | 16 | 30 | 36 | 48 |

Selected samples of zirconia produced from zirconyl chloride precursor were also analyzed for chemical purity by inductively coupled plasma analysis (Galbraith Labs, Knoxville Tenn.) and neutron activation analysis (NAA) (MIT, Cambridge Mass.). Five hundred milligrams of powder were produced in 100% oxygen at a temperature of 1500K for 2.1 s total residence time. Results are reported as the mass fraction of a given compound in the $ZrO_2$ sample in Table 8.

TABLE 8

Chemical Assay of $ZrO_2$ Powder Produced from $ZrOCl_2$ Precursor

| Compound | ICP (ppm) | NAA (ppm) |
|---|---|---|
| $HFO_2$ | 6400 | 3560 |
| $Fe_2O_3$ | 188 | 147 |
| W | <30 | <70 |
| Ta | <30 | <70 |

Impurity levels were less than the values specified by the chemical supplier, indicating that contamination (i.e., concentration of impurities) is minimal in this powder production process.

Surface area can be used to assess the overall cluster/grain size of the material examined. A sample of nanophase zirconia was prepared as described above from a zirconyl chloride (3% loading) solution at 1500K and 100% oxygen. The surface area of this sample was determined using a Micromeritics Instruments Corp. (Norcross, Ga.) Flowsorb II 2300 single point (single gas mixture) BET surface area instrument designed for powdered materials. To remove adsorbed species, such as water and carbon dioxide, each sample was first heated for 30 min at 363K under a flowing gas mixture of 30% $N_2$ in helium. Surface areas were then measured using $N_2$ adsorption at 77K and subsequent desorption at room temperature. This procedure was repeated three times for each sample and surface area was recorded as an average. The single point surface area of the sample was determined to be 14.7 $m^2/g \pm 2\%$.

Because nanometer scale grain size ceramics are expected to exhibit reduced sintering temperatures as a result of their grain structure, sintering tests of a pellet prepared with nanophase zirconia prepared as described above were conducted. The pellet was formed by uniaxial pressing of 200 mg of zirconia powder in a Beckman (Glenrothes, Scotland) K-13 KBr die, at a pressure of 75000 psi (15200 lb load) held for 30 minutes. Grain size and morphology of each pellet was determined by scanning electron microscope (SEM, Amray model 1400, IEA Analytical Labs, Billerica, Mass.). The cold pressed pellet was translucent to nearly transparent after pressing.

The pellet was submersed into a highly refractory mixed oxide in a ceramic combustion boat. The submersed pellet was then placed into a controlled atmosphere horizontal tube furnace, purged (10× volume) with oxygen (50 $cm^3$/min) and heated to 1573K at 6K/min (1573K was chosen because it is below the sintering temperature of standard-grain-size zirconia).

After 1 hour, heating was terminated and the furnace was allowed to cool naturally with an oxygen flow of 50 cm³/min.

The effects of sintering on pellet grain size and morphology were shown in SEM micrographs. Commercial yttria-doped zirconia powders were processed under similar conditions for comparison. Table 9 summarizes the results obtained from these experiments.

TABLE 9

Pellet Grain Sizes Before and After Sintering
Cold Pressed pellet (SEM)

| Test: | 114 nm +/−31 nm Span 50–200 nm |
|---|---|
| Commercial: | 3715 nm +/−719 nm Span 2970–5000 nm |

Sintered pellet @ 1573K (SEM)

| Test: | 1185 nm +/−297 nm Span 314–1500 nm |
|---|---|
| Commercial: | 3350 nm +/−691 nm Span 2000–4000 nm |

These results demonstrated that the $ZrO_2$ pellet grain size using nanophase powder produced according to the present invention increased by a factor of ten while the commercial yttria-doped powder was unaffected by the heat treatment process. It is likely that sintering of this material without such a large grain size increase would occur at even lower temperatures. These results clearly demonstrate that powders produced by the process have fine enough grain size to sinter at lower temperatures than commercially available powders.

Example 5

Nanophase Zirconium Oxide Production Using Sucrose/Water Solution Carrier Droplets This example demonstrates use of liquid organic carriers and dispersed (non-soluble) ceramic precursors to produce nanophase ceramics. Nanometer scale ceramic oxide particles can be produced by dispersing a non-soluble ceramic precursor such as a colloidal material in an organic liquid and spraying the resulting matrix material into a high temperature oxidizing environment.

A 20% $ZrO_2$ stabilized colloidal dispersion (Alpha Chemicals) with reported $ZrO_2$ crystallites of 5 to 10 nm was used as a zirconium precursor to examine zirconia formation in a liquid carrier/dispersed precursor system. A 3% by weight zirconium in sucrose solution was prepared in the same manner as described in Example 4. The solution was then atomized into a drying section at 350° C. followed by oxidation at 1500K in 100% $O_2$ for 2.1 s residence time. TEM analysis of the collected material indicated a uniform grain size distribution of 14 nm ±6 nm. Electron diffraction indicated the primary phase to be crystalline tetragonal zirconia (minor phase monoclinic). Process yield was 47% (yield defined as the mass of material with an aerodynamic diameter less than 1 μm and with nanometer scale grains).

TABLE 10

Mass Distribution for Colloidal Zr Precursor

| Filter | 5% |
|---|---|
| Stage 7 | 2 |
| Stage 6 | 7 |
| Stage 5 | 9 |
| Stage 4 | 24 |
| Unusable | 5 |

Equivalents

From the foregoing description, one skilled in the art can ascertain the essential characteristics of this invention and without departing from the spirit and scope thereof, can make various modifications of the invention which are equivalent. Such equivalents are intended to be encompassed by the following claims.

What is claimed is:

1. A process for producing nanometer sized ceramic particles comprising the steps of:
   combining a ceramic precursor with a carbohydrate carrier material forming a combination in which the precursor is associated with the carrier material;
   atomizing the combination thereby forming an aerosol;
   exposing the aerosol to a temperature above about 1000 K. thereby causing combustion of the carrier material and vaporization and nucleation, or diffusion and oxidation, of the ceramic precursor thereby forming substantially non-agglomerated ceramic particles having a diameter of less than 100 nm.

2. The process of claim 1 wherein the ceramic particles are crystalline.

3. The process of claims 1 wherein the ceramic precursor is a metal, metal salt, metal oxide or organometallic compound.

4. The process of claim 3 wherein the metal is selected from the group consisting of titanium, iron, aluminum, zirconium, magnesium, barium, lead and yttrium.

5. The process of claim 3 wherein the ceramic precursor comprises a mixture of two or more metals, metal salts, metal oxides or organometallic compounds.

6. The process of claim 3 wherein the ceramic precursor is a metal comprising a mixture of two or more metals.

7. The process of claim 1 wherein the carbohydrate is sucrose.

8. The process of claim 1 wherein the ratio of carrier material to metal contained within the ceramic precursor is from about 10:1 to about 100:1 on a weight basis.

9. A process for producing crystalline, nanophase ceramic particles comprising the steps of
   combining a carbohydrate carrier material and an inorganic ceramic precursor to form a mixture thereof;
   atomizing or grinding the mixture to form a powder;
   introducing an aerosol of the powder into a reactor having a temperature above about 1000 K and an oxygen concentration in the range of about 20 to about 100%, thereby causing combustion of the carbohydrate material and vaporization and nucleation or diffusion and oxidation of the ceramic precursor resulting in formation of substantially non-agglomerated crystalline ceramic particles having a diameter of less than 100 mn.

10. The process of claim 9 wherein the ceramic particles are less than 20 nm in diameter.

11. The process of claim 9 wherein the ratio of carrier material to metal contained within the ceramic precursor material is from about 10:1 to about 100:1.

12. The process of claim 9 wherein the steps of introducing the aerosol of the powder into the reactor, combustion of the carbohydrate material and formation of the ceramic particles has a duration of about 2–3 seconds.

* * * * *